(12) United States Patent
Tiger et al.

(10) Patent No.: US 10,778,939 B2
(45) Date of Patent: Sep. 15, 2020

(54) MEDIA EFFECTS USING PREDICTED FACIAL FEATURE LOCATIONS

(71) Applicant: Facebook, Inc., Menlo Park, CA (US)

(72) Inventors: Roi Tiger, Palo Alto, CA (US); Lior Gonnen, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/713,596

(22) Filed: Sep. 22, 2017

(65) Prior Publication Data

US 2019/0098252 A1    Mar. 28, 2019

(51) Int. Cl.
| | | |
|---|---|---|
| *H04N 9/80* | (2006.01) |
| *H04N 5/93* | (2006.01) |
| *G11B 27/031* | (2006.01) |
| *G06K 9/00* | (2006.01) |
| *G06T 3/00* | (2006.01) |
| *G06T 7/13* | (2017.01) |
| *G06T 3/60* | (2006.01) |
| *G06T 11/60* | (2006.01) |
| *G06T 7/73* | (2017.01) |
| *H04N 9/87* | (2006.01) |
| *G11B 27/00* | (2006.01) |

(52) U.S. Cl.
CPC ....... *H04N 5/9305* (2013.01); *G06K 9/00275* (2013.01); *G06K 9/00281* (2013.01); *G06K 9/00671* (2013.01); *G06T 3/0093* (2013.01); *G06T 3/60* (2013.01); *G06T 7/13* (2017.01); *G06T 7/73* (2017.01); *G06T 11/60* (2013.01); *G11B 27/031* (2013.01); *H04N 9/8715* (2013.01); *G06T 2207/10016* (2013.01); *G06T 2207/30201* (2013.01); *G06T 2210/12* (2013.01)

(58) Field of Classification Search
USPC .................................................. 386/248, 280
See application file for complete search history.

(56) References Cited

U.S. PATENT DOCUMENTS

| | | | | |
|---|---|---|---|---|
| 8,542,265 B1 * | 9/2013 | Dodd | ....................... | H04N 7/15 348/14.08 |
| 2009/0196475 A1 * | 8/2009 | Demirli | ................... | A61B 5/441 382/128 |
| 2010/0007665 A1 * | 1/2010 | Smith | ..................... | G06T 13/40 345/473 |
| 2012/0219180 A1 * | 8/2012 | Mehra | ..................... | G06F 3/013 382/103 |

(Continued)

*Primary Examiner* — Nigar Chowdhury
(74) *Attorney, Agent, or Firm* — Fenwick & West LLP (57) ABSTRACT

An effects application receives a video of a face and detects a bounding box for each frame indicating the location and size of the face in each frame. In one or more reference frames. The application uses an algorithm to determine locations of facial features in the frame. The application then normalizes the feature locations relative to the bounding box and saves the normalized feature locations. In other frames (e.g., target frames), the application obtains the bounding box and then predicts the locations of the facial features based on the size and location of the bounding box and the normalized feature locations calculated in the reference frame. The predicted locations can be made available to an augmented reality function that overlays graphics in a video stream based on face tracking in order to apply a desired effect to the video.

14 Claims, 3 Drawing Sheets

(56) References Cited

U.S. PATENT DOCUMENTS

| | | | |
|---|---|---|---|
| 2013/0051632 A1* | 2/2013 | Tsai | G06K 9/00892 382/118 |
| 2014/0063237 A1* | 3/2014 | Stone | H04N 7/181 348/143 |
| 2014/0072275 A1* | 3/2014 | Nagasaka | H04N 9/79 386/230 |
| 2014/0168056 A1* | 6/2014 | Swaminathan | G06K 9/00604 345/156 |
| 2015/0318020 A1* | 11/2015 | Pribula | H04N 21/43615 386/227 |
| 2016/0073040 A1* | 3/2016 | Jen | G06T 7/10 348/239 |
| 2016/0217319 A1* | 7/2016 | Bhanu | G06K 9/00288 |
| 2016/0307335 A1* | 10/2016 | Perry | G06T 7/292 |
| 2017/0123756 A1* | 5/2017 | Campbell | G06T 11/60 |
| 2017/0213112 A1* | 7/2017 | Sachs | G06K 9/66 |
| 2017/0339409 A1* | 11/2017 | Socek | H04N 19/124 |
| 2018/0032794 A1* | 2/2018 | Ji | G06T 7/248 |
| 2018/0047200 A1* | 2/2018 | O'Hara | G06T 13/40 |
| 2018/0063482 A1* | 3/2018 | Goesnar | H04N 5/2226 |
| 2018/0174600 A1* | 6/2018 | Chaudhuri | G06K 9/00744 |
| 2018/0190322 A1* | 7/2018 | Zukerman | G06K 9/00765 |
| 2019/0172184 A1* | 6/2019 | Pan | G06T 5/003 |

\* cited by examiner

MEDIA EFFECTS USING PREDICTED FACIAL FEATURE LOCATIONS

BACKGROUND

This disclosure relates generally to generating effects during playback of media content.

One of the primary uses for mobile devices is to capture and share video or images. To make the captured content more interesting, various mobile applications enable users to add effects to the captured content to modify the content prior to sharing. Some popular mobile applications track facial features in a video of a subject's face and overlay an image and/or warp the video based on the locations of the facial features. For example, the application may generate an augmented reality output video in which the subject has an animated mask that fits the subject's facial features and mimics the user's movements. However, conventional methods for applying such effects may be computationally intensive. Thus, depending on the particular capabilities of the device, such effects may cause an undesired drop in performance.

SUMMARY

A method, non-transitory computer-readable storage medium, and computing device generates an effect during playback of media content. A video is received comprising a sequence of video frames. A face of a subject is detected in a target video frame of the sequence of video frames. A target bounding box for the detected face is detected in the target video frame. A transformation is applied to the target bounding box to estimate locations of facial features for the detected face in the target video frame. An effect is applied to alter the target video frame based on the estimated locations of the facial features for the detected face in the target video frame to generate an altered video frame. The altered video frame it then outputted.

BRIEF DESCRIPTION OF THE DRAWINGS

The figures depict various embodiments for purposes of illustration only.

One skilled in the art will readily recognize from the following discussion that alternative embodiments of the structures and methods illustrated herein may be employed without departing from the principles described herein.

DETAILED DESCRIPTION

Overview

An effects application receives a video of a face and detects a bounding box for each frame indicating the location and size of the face in each frame. In one or more reference frames. The application uses an algorithm to determine locations of facial features in the frame. The application then normalizes the feature locations relative to the bounding box and saves the normalized feature locations. In other frames (e.g., target frames), the application obtains the bounding box and then predicts the locations of the facial features based on the size and location of the bounding box and the normalized feature locations calculated in the reference frame. The predicted locations can be made available to an augmented reality function that overlays graphics in a video stream based on face tracking in order to apply a desired effect to the video.

System Architecture

Figure 1:
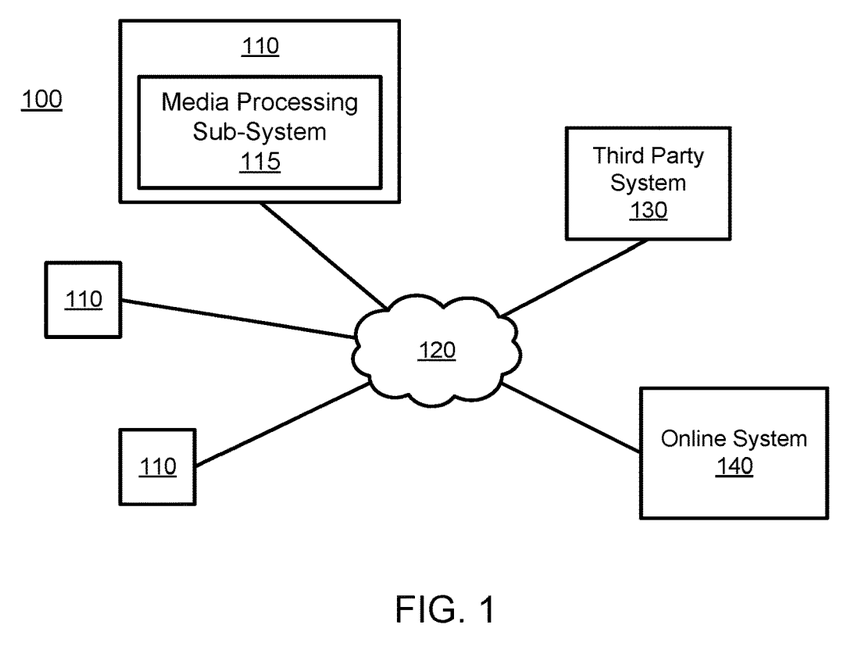
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, a messaging server, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

As further described below in conjunction with FIG. 3, in various embodiments a client device 110 includes a media processing sub-system 115 that may include a media capture device capable of capturing media (e.g., video), an application for modifying the captured media, and an application for sharing the modified media with one or more other users (e.g., via a messaging application or social networking application). For example, an application executing on the client device 110 allows a user of the client device 110 to apply a filter or overlay additional content onto portions of video data captured by an image capture device or otherwise obtained by the client device 110. The application may also allow the user to exchange the modified video data and other content (e.g., text messages, images, etc.) with other users of the online system 140.

In a particular example, the media processing sub-system 115 of the client device 110 may detect a face in a video, identify one or more facial feature locations in the detected face, and apply a filter or overlay to alter the depiction of the face in some way. For example, the filter may produce an effect of adding an animated mask to the face that fits the user's facial features and mimics the user's movements. An application on the client device 110 may enable the user to quickly select different filters while a camera is capturing video of the user's face and provide a display of the modified video in real-time or near-real time as it is captured. In a particular embodiment, a user can capture a snapshot of a frame of the video with the rendered effect for storing or sharing with other users in the online system 110. An example client device 110 is further described below in conjunction with FIG. 3.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content.

Figure 2:
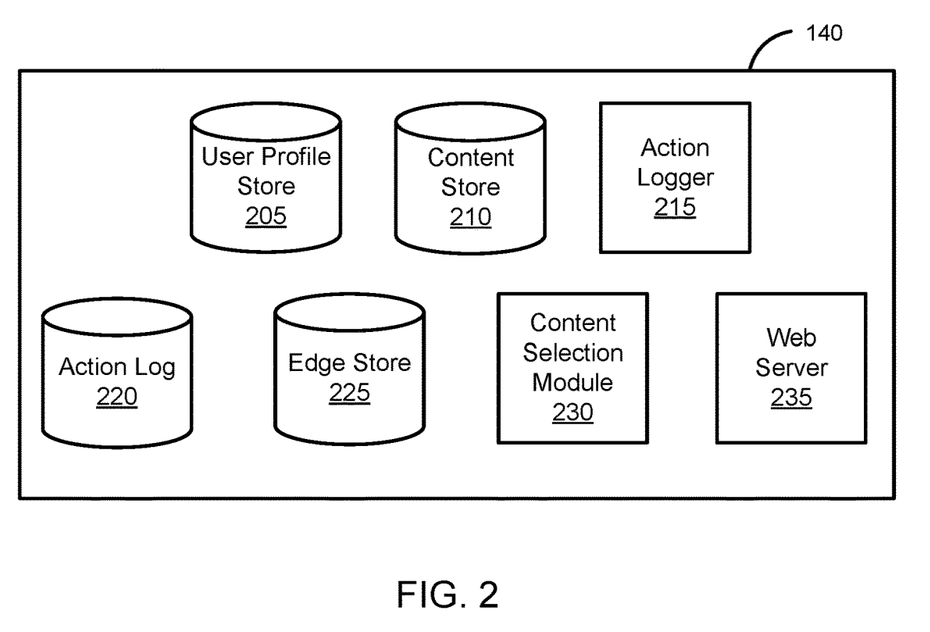
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, the content store 210 includes media data captured by a client device 110. The client device 110 may communicate the media data (which may be modified by one or more user-selected effects) to the online system 140, which stores the video data in the content store 210. In various embodiments, the online system 140 receives information identifying a user of the online system 140 along with the media data and stores the information identifying the user in association with the media data. The online system 140 may retrieve media data from the content store 205 and provide the media (which may be modified by one or more user-selected effects) to client devices 110 associated with other users of the online system 140 in response to receiving a request from the user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Media Processing Sub-System

Figure 3:
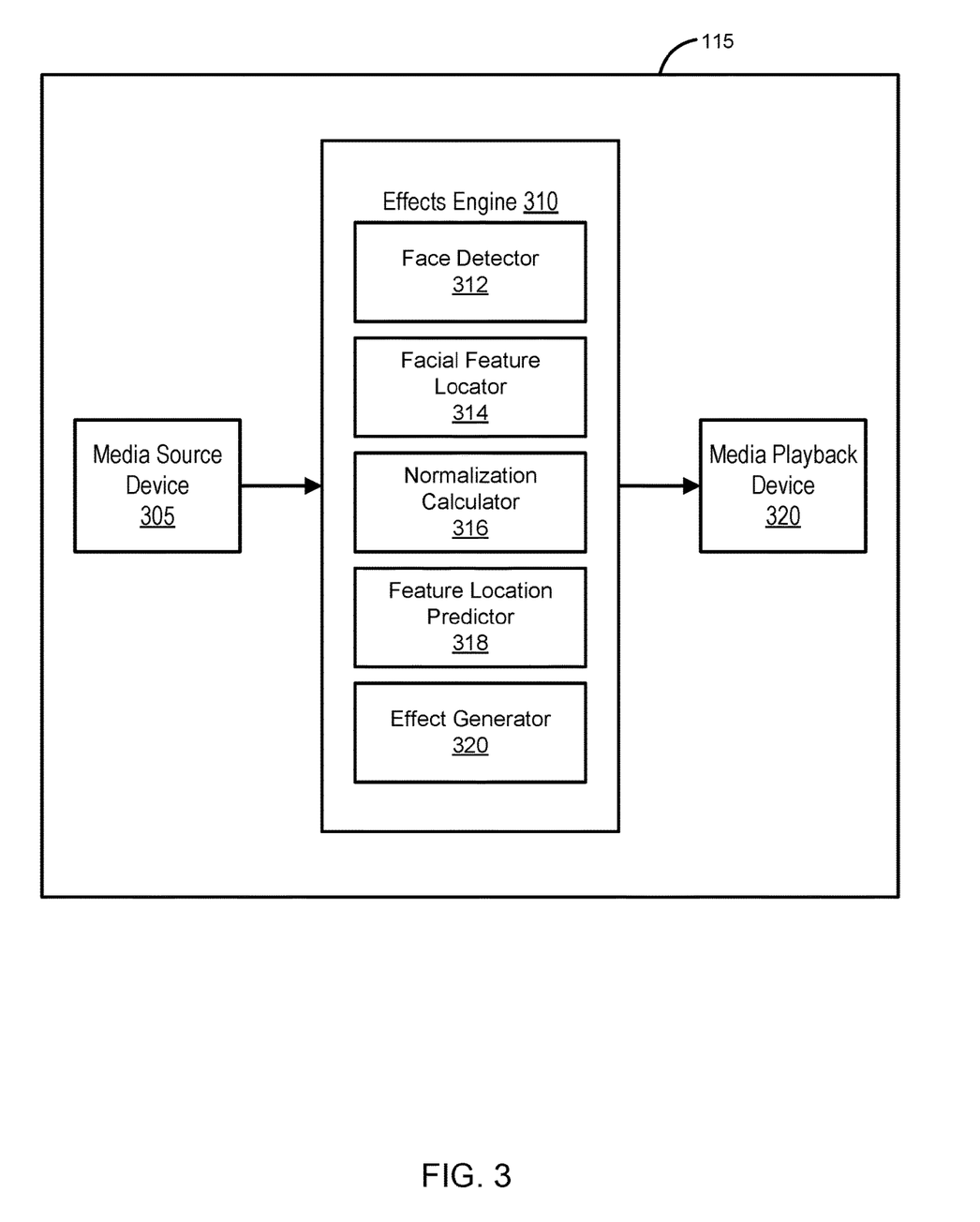
FIG. 3 is a block diagram of an example media processing sub-system, in accordance with one embodiment.

FIG. 3 is a block diagram of one embodiment of a media processing sub-system 115 of a client device 110. The media processing sub-system 115 includes a media source device 305, an effects engine 310, and a media playback device 320. In other embodiments, the media processing sub-system 115 may include additional, fewer, or different components for various applications. In an embodiment, one or more components of the media processing sub-system 115 may be implemented as instructions stored to a computer-readable storage medium that when executed by a processor of the client device 110 causes the processor to carry out the functions attributed to the components as described herein.

The media source device 305 is any device capable of providing image or video data. The media source device 305 may comprise a capture device that may provide the media directly to the effects engine 310 as it is captured. For example, the media source device 305 may include one or more still image cameras, one or more video cameras, one or more microphones and associated audio processing components, or any other device capable of capturing media content. Alternatively, the media source 305 may comprise a storage medium that stores media (e.g., as a digital file) that can be read by the effects engine 310. In yet another embodiment, the media source device 305 may comprise a network interface that enables the client to receive a media stream from another client (e.g., via the network 120). In this embodiment, the media source device 305 may receive the media stream via e.g., a messaging application that enables a user to receive direct messages from another user via the network or a social networking application that enables a user to access posts on a social networking site that includes the media content. While FIG. 3 shows a client device 110 having a single media source device 305, in various embodiments, client devices 110 may include multiple media source devices 305 (e.g., a storage, a camera, and a microphone).

The effects engine 310 receives media from the media source device 305 and applies an effect to alter the media. For example, the effects engine may overlay text, image, or video content on a video received by the effects engine 310. In another example, the effects engine 310 may apply a filter to a video to introduce lighting effects, color alteration effects, motion effects, distortion effects, cropping effects, zooming effects, or other special effects. In a particular example, the effects engine 310 may produce an effect based on face tracking such as adding an animated mask to the face that fits the user's facial features and mimics the user's movements.

In an embodiment, the effects engine 310 comprises a face detector 312, a facial feature locator 314, a normalization calculator 316, a feature location predictor 318, and an effect generator 318. In alternative embodiments, the effects engine 310 may include additional or different components.

The face detector 312 detects a face in an image or video and generates a bounding box indicating the detected location and size of the face. For example, the bounding box may comprise a rectangle approximately outlining the face such that the edges of the bounding box approximately align with the outermost pixels forming part of the face in each direction. The bounding box may be represented, for example, by a height, width, and location defining the bounding box. The location may be represented as, for example, a pixel location (e.g., an x, y location) of a reference pixel which may correspond to, for example, a predefined corner pixel (e.g., the upper left corner of the bounding box), a center pixel (e.g., at the center of the bounding box), or other predefined location that enables the bounding box to be defined together with the width and height. Alternatively, other parameters may be used to define the bounding box. For example, the bounding box may be defined by the locations of two opposite corners. In an embodiment, the face detector 312 may obtain the bounding box using a built in function of an operating system of the client 110 that returns the bounding box in response to an input image that includes a face.

The facial feature locator 314 locates facial features of a face in an input image or video. The facial features represent anatomical points on a human face that can be automatically detected in a consistent way between multiple varied subjects under different lighting conditions, orientations, etc. For example, the facial features may indicate locations of certain prominent points of the face such as the eyes, mouth and nose. In other embodiments, the facial features may include, for example, the lips, eyebrows, chin, forehead, ears or other anatomical landmarks. In different embodiments, different numbers or types of facial features may be used. The facial feature locator 314 may output the detected facial features as a set of pixel locations (e.g., x, y locations). In an embodiment, the facial feature locator 314 may obtain the locations of the facial features using a built in function of an operating system of the client 110 that returns the locations in response to an input image that includes a face.

The detection of the facial feature locations using the facial feature locator 314 is relatively computationally expensive relative to detecting only the bounding box. Thus, it may be desirable to detect the facial features only in a small number of frames instead of in every frame. For example, in an embodiment, facial feature locations are detected only in select frames referred to herein as "reference frames." In other frames (referred to herein as "target frames"), the facial feature locations are not directly detected, but instead may be estimated from the bounding box as will be described in further detail below.

The normalization calculator 316 normalizes the locations of the detected features relative to the bounding box to determine normalized feature locations. For example, in one embodiment, the normalization calculator 316 normalizes a facial feature i having an absolute position $x_i$, $y_i$ as:

$$x_i' = \frac{x_i - l_x}{w} \quad (1)$$

$$y_i' = \frac{y_i - l_y}{h} \quad (2)$$

where $x_i'$, $y_i'$ is the normalized position relative to the bounding box for the feature i, $l_x$, $l_y$ is the location of the top left corner of the bounding box, w is the width of the bounding box, and y is the height of the bounding box. For example, using equation (1), the normalization calculator 316 determines a horizontal offset of a horizontal location $x_i$ of a given facial feature i from a vertical edge of the reference bounding box (represented by $l_x$). The normalization calculator 316 then determines the normalized horizontal location $x_i'$ as a ratio of the horizontal offset (given by $x_i - l_x$) to the width w of the bounding box. Similarly, using equation (2), the normalization calculator 316 determines a vertical offset of a vertical location $y_i$ of a given facial feature i from a horizontal edge of the reference bounding box (represented by $l_y$). A normalized vertical location $y_i'$ is then determined as a ratio of the vertical offset (given by $y_i - l_y$) to the height h of the bounding box. The normalized positions thus represent a relative location of each facial feature within the bounding box that is independent of the location of the bounding box within the image and independent of the relative size of the bounding box relative to the overall image.

In an embodiment, the facial feature locator 314 and the normalization calculator 316 may operate on only on one or more reference frames of the video. For example, the normalized feature positions may be computed for only a first frame of a video without directly re-detecting the facial feature locations or computing the normalized positions in subsequent frames. Alternatively, multiple reference frames may be used (e.g., at periodic intervals).

The feature location predictor 318 predicts the locations of the facial features in target frames in which the facial feature locator 314 does not directly detect the feature locations. Instead, in the target frames, the bounding box and the normalized feature positions (computed in the reference frame) are used to predict the facial feature locations. For example, the feature location predictor 318 may apply the following transformation to the bounding box detected in the target frame to predict the location of a feature i:

$$x_i = x_i'w + l_x \quad (3)$$

$$y_i = y_i'h + l_y \quad (4)$$

where $x_i'$, $y_i'$ is the normalized position for the feature i computed in the reference frame, $l_x$, $l_y$ is the location of the top left corner of the bounding box detected in the target frame, w is the width of the bounding box detected in the target frame, and y is the height of the bounding box detected in the target frame. For example, using equation (3), the feature location predictor 318 determines a relative horizontal offset of a given facial feature i within the bounding box as a product of a width w of the bounding box and the normalized horizontal location $x_i'$ computed from the reference frame. The relative horizontal offset (given by $x_i'w$) is offset by a horizontal position of the bound box (represented by the horizontal component $l_x$ of reference point for the bounding box). This estimates the absolute horizontal position $x_i$ of the facial feature i within the image without detecting it directly. Similarly, using equation (4), the feature location predictor 318 determines a relative vertical offset of a given facial feature i within the bounding box as a product of a height h of the bounding box and the normalized vertical location $y_i'$ computed from the reference frame. The relative vertical offset (given by $y_i'h$) is offset by a horizontal position of the bound box (represented by the horizontal component $l_y$ of reference point for the bounding box). This estimates the absolute vertical positions $y_i$ of the facial feature i within the image without detecting it directly.

In an alternative embodiment, the feature location predictor 318 may utilize normalized facial positions from multiple references frames instead of a single reference frame. For example, the feature location predictor 318 may generate a single transformation that approximates the mapping from the bounding box to the facial feature locations over the multiple references frames. In another alternative embodiment, a machine learning algorithm may learn a model describing the relationships between the bounding box and the facial feature locations over a large number of frames, which may include various subjects under different conditions. The feature location predictor 318 may then apply the machine-learned model to predict the facial feature locations based on the detected bounding box.

The effect generator 318 applies an effect to each target frame using the predicted locations of the facial features in that target frame. For example, the effect generator 318 may apply any effect that relies on face tracking by utilizing the predicted facial feature locations instead of by directly detecting them. Here, the effects generator 318 may warp an overlaid image (e.g., a mask) such that alignment points on the overlaid image align with the predicted facial feature locations in a predefined way. Thus, the overlaid image appears to conform to the subject's face and may move as the subject's face moves throughout the video. For example, the image of the face may be altered to appear as if the subject is wearing glasses or a hat, has a beard or mustache, has animal ears or nose, or to introduce another interesting effect. Alternatively, the effects generator 318 may apply a warp to the subject's face to cause the predicted facial feature locations to align with alignment points in a predefined way without necessarily overlaying an image. For example, the warp may cause the subject's face to appear more elongated or fatter. Various conventional augmented reality algorithms may be used to apply the effect using the predicted facial feature locations instead of directly detected feature locations.

In an embodiment, in order to provide even more realistic effects, the effect generator 318 may analyze changes in the bounding box over a sequence of frames to predict motion of the subject and apply an effect based on the predicted motion. For example, when a subject turns his or her head to the side, the bounding box generally becomes narrower in width without significantly changing in height. An angle of horizontal rotation may be predicted based on the relative change in width of the bounding box. Alternatively, when a subject looks up or down, the bounding box generally becomes narrower in height without significantly changing in width. An angle of vertical rotation may then be predicted based on the relative change in height of the bounding box. Then, the overlaid image may be similarly rotated in three-dimensional space according to the estimated angles to better conform to the subject's face.

In an embodiment, an application executing on the client 110 provides a user interface that enables a user to select a particular effect from a plurality of selectable effects. The effect may be applied in real-time or near real-time as the effect is selected. For example, in one embodiment, the media source device 305 may provide a stream of video frames to the effects engine 310, and the effects engine applies the effect to the frames as they are received.

The media playback device 320 receives the processed media from the effects engine 310 and plays the media. For example, the media playback device 320 may comprise a display screen such as a liquid crystal display (LCD), an organic light emitting diode (OLED) display, an active matrix liquid crystal display (AMLCD), or any other suitable display device. In an embodiment, an application on the client 110 enables the user to capture a snapshot of a video frame with the applied effect as the video is displayed in real-time. The snapshot can then be shared with other users via the online system 140.

In an embodiment, the media playback device 320 may operate on a client 110 remote from the client 110 hosting the media source device 305 and the effects engine 310. Thus, for example, the video may be generated on one client and streamed over the network 120 to another client 110 (e.g., via the online system 140). Furthermore, in an embodiment, the media source device 305 may operate on a client 110 remote from the client 110 hosting the effects engine 310 and the media playback device 320. In this embodiment, a client 110 may send raw video over a network 120 to a remote client 110, and the remote client 110 may apply the effect 310 and output the video 320 with the applied effect.

Process for Applying an Effect to a Video

Figure 4:
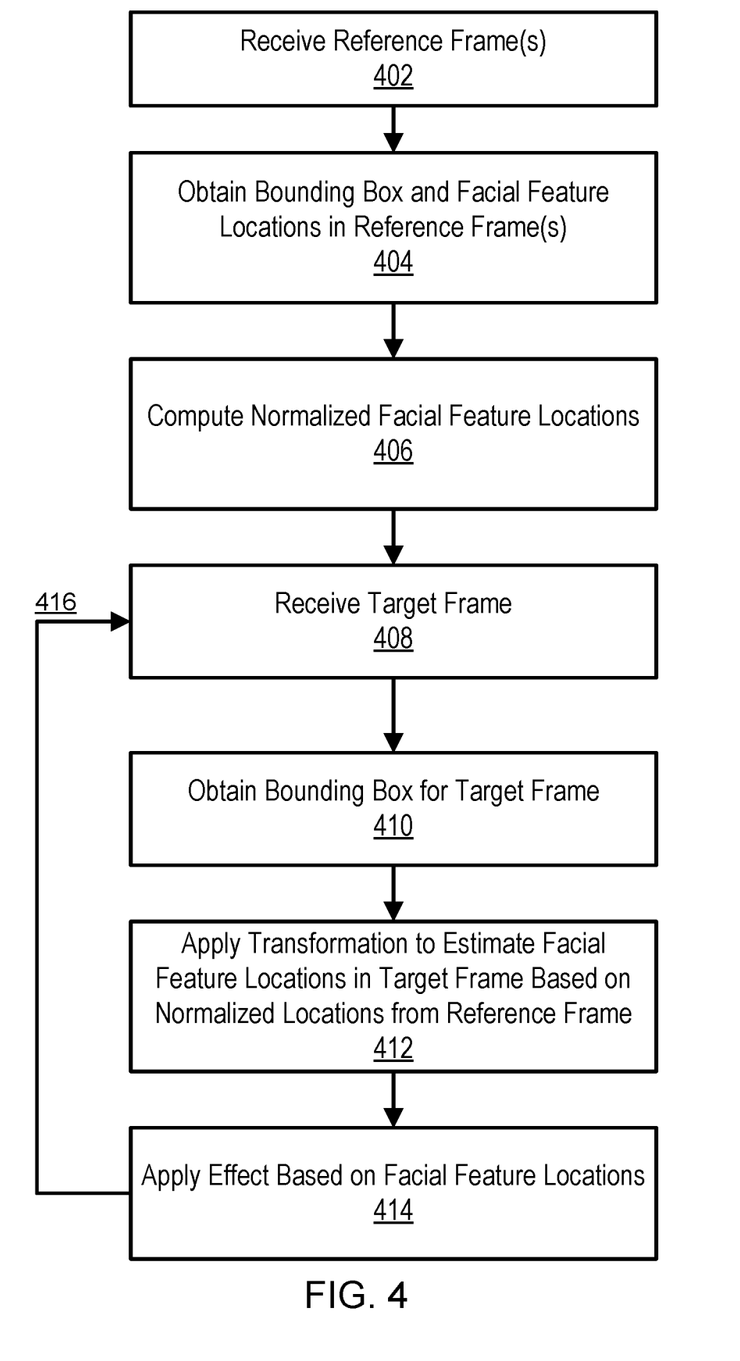
FIG. 4 is a flowchart illustrating an embodiment of a process for applying an effect to a subject's face in a captured video.

FIG. 4 is a flowchart illustrating an embodiment of a process for applying an effect to a video. A reference video frame is received 402. For example, the reference video frame may correspond to a first frame in a video. A bounding box for the face and the locations of the facial features in the reference video frame are detected 404. Normalized facial feature locations are then computed 406 that specify the facial feature locations relative to the bounding box. A target frame is then received 408 and a bounding box is obtained 410 for the target frame. A transformation is applied 412 to the bounding box to estimate the facial feature locations based on the normalized facial feature locations detected in the reference. An effect is then applied 414 based on the facial feature locations. For example, the predicted facial feature locations may be applied to an augmented reality application that overlays a mask to the face or warps the face according to a user-selected filter. Steps 408-414 may be repeated 416 for additional target frames in a video.

Beneficially, the facial features are only directly detected in the reference frame and need not be re-detected in the target frames. Thus, for example, the facial features may be detected only in the first frame of video and facial feature locations are instead predicted based on the bounding box in all subsequent frames. Because detection of the facial features is significantly more computationally intensive than detecting the bounding box, the computational resource usage may be significantly reduced by using the process of FIG. 4 compared to a process that directly detects the facial features in every frame. This is particularly beneficial when the application executes on a mobile device that may lack the computation resources to detect the facial features at every frame without the performance of the video playback suffering (e.g., reducing the resolution, frame rate, or other parameter).

In one embodiment, the facial feature locations may be re-detected and the transformation re-computed periodically instead of only at the beginning of the video. In this embodiment, steps 402-406 may be applied during reference frames occurring every N frames while steps 408-412 are applied in the remaining frames.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
   receiving a video comprising a sequence of video frames;
   detecting a face of a subject in a target video frame of the sequence of video frames;
   obtaining a target bounding box for the detected face in the target video frame, the target bounding box having edges aligning with detected outermost pixels of the detected face;
   obtaining a reference bounding box for the detected face in a reference video frame of the video;
   applying a feature detection algorithm to detect location of facial features for the detected face in the reference video frame;
   determining a horizontal offset of a first location of a given facial feature from a vertical edge of the reference bounding box;
   determining a normalized first location as a ratio of the horizontal offset to a width of the reference bounding box;
   determining a vertical offset of a first location of the given facial feature from a horizontal edge of the reference bounding box;
   determining a normalized second location as a ratio of the vertical offset to a height of the reference bounding box;
   applying a transformation to the target bounding box to estimate locations of the facial features for the detected face in the target video frame, the transformation based on the normalized first and second locations;
   applying an effect to alter the target video frame based on the estimated locations of the facial features for the detected face in the target video frame to generate an altered video frame; and
   outputting the altered video frame.

2. The method of claim 1, wherein applying the transformation comprises:
   determining a relative horizontal offset of a given facial feature within the target bounding box as a product of a width of the target bounding box and the normalized horizontal location; and
   offsetting the relative horizontal offset by a horizontal location of the target bounding box to determine an absolute horizontal position of the given facial feature;
   determining a relative vertical offset of the given facial feature within the target bounding box as a product of a height of the target bounding box and the normalized vertical location; and
   offsetting the relative vertical offset by a vertical location of the target bounding box to determine an absolute vertical position of the given facial feature.

3. The method of claim 1, wherein applying the effect comprises:
   warping a mask image such that alignment points on the mask image align with the estimated locations of the facial features; and
   overlaying the mask image on the target frame.

4. The method of claim 3, wherein applying the effect further comprises:
   predicting a rotation of the face based on a narrowing of a width of the target bounding box relative to a bounding box for prior video frame; and
   rotating the mask image based on the predicted rotation.

5. The method of claim 1, wherein the facial features comprise eyes and a nose.

6. A non-transitory computer-readable storage medium storing instructions that when executed by a processor cause the processor to perform steps including:
   receiving a video comprising a sequence of video frames;
   detecting a face of a subject in a target video frame of the sequence of video frames;
   obtaining a target bounding box for the detected face in the target video frame, the target bounding box having edges aligning with detected outermost pixels of the detected face;
   obtaining a reference bounding box for the detected face in a reference video frame of the video;
   applying a feature detection algorithm to detect location of facial features for the detected face in the reference video frame;

determining a horizontal offset of a first location of a given facial feature from a vertical edge of the reference bounding box;

determining a normalized first location as a ratio of the horizontal offset to a width of the reference bounding box;

determining a vertical offset of a first location of the given facial feature from a horizontal edge of the reference bounding box;

determining a normalized second location as a ratio of the vertical offset to a height of the reference bounding box;

applying a transformation to the target bounding box to estimate locations of the facial features for the detected face in the target video frame, the transformation based on the normalized first and second locations;

applying an effect to alter the target video frame based on the estimated locations of the facial features for the detected face in the target video frame to generate an altered video frame; and outputting the altered video frame.

7. The non-transitory computer-readable storage medium of claim 6, wherein applying the transformation comprises:

determining a relative horizontal offset of a given facial feature within the target bounding box as a product of a width of the target bounding box and the normalized horizontal location; and offsetting the relative horizontal offset by a horizontal location of the target bounding box to determine an absolute horizontal position of the given facial feature;

determining a relative vertical offset of the given facial feature within the target bounding box as a product of a height of the target bounding box and the normalized vertical location; and offsetting the relative vertical offset by a vertical location of the target bounding box to determine an absolute vertical position of the given facial feature.

8. The non-transitory computer-readable storage medium of claim 6, wherein applying the effect comprises:

warping a mask image such that alignment points on the mask image align with the estimated locations of the facial features; and overlaying the mask image on the target frame.

9. The non-transitory computer-readable storage medium of claim 8, wherein applying the effect further comprises:

predicting a rotation of the face based on a narrowing of a width of the target bounding box relative to a bounding box for prior video frame; and rotating the mask image based on the predicted rotation.

10. The non-transitory computer-readable storage medium of claim 6, wherein the facial features comprise eyes and a nose.

11. A computer device comprising:

a processor; and a non-transitory computer-readable storage medium storing instructions that when executed by a processor cause the processor to perform steps including:

receiving a video comprising a sequence of video frames;

detecting a face of a subject in a target video frame of the sequence of video frames;

obtaining a target bounding box for the detected face in the target video frame, the target bounding box having edges aligning with detected outermost pixels of the detected face;

obtaining a reference bounding box for the detected face in a reference video frame of the video;

applying a feature detection algorithm to detect location of facial features for the detected face in the reference video frame;

determining a horizontal offset of a first location of a given facial feature from a vertical edge of the reference bounding box;

determining a normalized first location as a ratio of the horizontal offset to a width of the reference bounding box;

determining a vertical offset of a first location of the given facial feature from a horizontal edge of the reference bounding box;

determining a normalized second location as a ratio of the vertical offset to a height of the reference bounding box;

applying a transformation to the target bounding box to estimate locations of the facial features for the detected face in the target video frame, the transformation based on the normalized first and second locations;

applying an effect to alter the target video frame based on the estimated locations of the facial features for the detected face in the target video frame to generate an altered video frame; and outputting the altered video frame.

12. The computer device of claim 11, wherein applying the transformation comprises:

determining a relative horizontal offset of a given facial feature within the target bounding box as a product of a width of the target bounding box and the normalized horizontal location; and offsetting the relative horizontal offset by a horizontal location of the target bounding box to determine an absolute horizontal position of the given facial feature;

determining a relative vertical offset of the given facial feature within the target bounding box as a product of a height of the target bounding box and the normalized vertical location; and offsetting the relative vertical offset by a vertical location of the target bounding box to determine an absolute vertical position of the given facial feature.

13. The computer device of claim 11, wherein applying the effect comprises:

warping a mask image such that alignment points on the mask image align with the estimated locations of the facial features; and overlaying the mask image on the target frame.

14. The computer device of claim 13, wherein applying the effect further comprises:

predicting a rotation of the face based on a narrowing of a width of the target bounding box relative to a bounding box for prior video frame; and rotating the mask image based on the predicted rotation.

* * * * *